(12) United States Patent
Ting et al.

(10) Patent No.: US 7,921,110 B1
(45) Date of Patent: Apr. 5, 2011

(54) SYSTEM AND METHOD FOR COMPARING DATA SETS

(75) Inventors: Daniel Ting, Palo Alto, CA (US);
Stephen L. Manley, Pleasanton, CA (US); Rimas Svarcas, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 337 days.

(21) Appl. No.: 10/776,057

(22) Filed: Feb. 11, 2004

Related U.S. Application Data

(60) Provisional application No. 60/531,890, filed on Dec. 23, 2003.

(51) Int. Cl.
G06F 7/00 (2006.01)
G06F 17/30 (2006.01)

(52) U.S. Cl. .................................. 707/736; 707/758

(58) Field of Classification Search .................. None
See application file for complete search history.

(56) References Cited

U.S. PATENT DOCUMENTS

| | | |
|---|---|---|
| 4,570,217 A | 2/1986 | Allen et al. |
| 5,163,131 A | 11/1992 | Row et al. |
| 5,202,979 A | 4/1993 | Hillis et al. |
| 5,278,979 A | 1/1994 | Foster et al. |
| 5,355,453 A | 10/1994 | Row et al. |
| 5,485,579 A | 1/1996 | Hitz et al. |
| 5,802,366 A | 9/1998 | Row et al. |
| 5,819,292 A | 10/1998 | Hitz et al. |
| 5,835,953 A | 11/1998 | Ohran |
| 5,931,918 A | 8/1999 | Row et al. |
| 5,941,972 A | 8/1999 | Hoese et al. |
| 5,963,962 A | 10/1999 | Hitz et al. |
| 5,987,506 A | 11/1999 | Carter et al. |
| 6,065,037 A | 5/2000 | Hitz et al. |
| 6,240,409 B1 * | 5/2001 | Aiken ............................. 707/4 |
| 6,289,356 B1 | 9/2001 | Hitz et al. |
| 6,425,035 B2 | 7/2002 | Hoese et al. |

(Continued)

FOREIGN PATENT DOCUMENTS

EP 1003103 A2 5/2000

(Continued)

OTHER PUBLICATIONS

"Adaptive set intersections, unions, and differences", by Demaine et al, Proceedings of the Annual ACM-SIAM Symposium on Discrete Algorithms, pp. 743-752, Year: 2000.*
Mastering Algorithms with Perl, by Jon Orwant et al., Publisher: O'Reilly Media, Inc., Pub Date: Aug. 20, 1999, ISBN-10: 1-565-92398-7.*
rsync Unix command manual page, version 2.4.1, Feb. 2000.*
Rationale for Adding Hash Table to the C++ Standard Template Library, by David R. Musser, Computer Science Department, Rensselaer Polytechnic Institute, Feb. 1995.*
"NESTOR: An Architecture for Network Self-Management and Organization", by Yemini et al., IEEE Journal on Selected Areas in Communications, vol. 18, No. 5, May 2000, pp. 758-766.*

(Continued)

*Primary Examiner* — Jay A Morrison
(74) *Attorney, Agent, or Firm* — Cesari and McKenna, LLP

(57) ABSTRACT

The present invention provides a system and method for comparing data sets, to ensure that they are accurate reflections of each other, without the need for performing $O(N^2)$ operations, in which N is the size of each data set. A hash table is generated for the first data set. For each of the second data set entries, should the entry not exist in the hash table, the entry is second data set unique. Otherwise, the entry is removed from the hash table. At the end of the pass through the second data set entries, only those entries that exist in the hash table are first data set unique. Alternately, two processes operate in parallel so that each selects entries from one of the data sets and determines if the entry exists in the hash table. If the entry does exist, it is removed. Otherwise, the entry is added to the hash table.

35 Claims, 5 Drawing Sheets

U.S. PATENT DOCUMENTS

| | | | |
|---|---|---|---|
| 6,466,696 | B1 | 10/2002 | Politis |
| 6,473,767 | B1* | 10/2002 | Bailey et al. ................. 707/102 |
| 6,574,591 | B1 | 6/2003 | Kleiman et al. |
| 6,604,118 | B2 | 8/2003 | Kleiman et al. |
| 6,606,694 | B2* | 8/2003 | Carteau ........................ 711/162 |
| 6,662,196 | B2 | 12/2003 | Holenstein et al. |
| 6,748,504 | B2 | 6/2004 | Sawdon et al. |
| 6,993,539 | B2 | 1/2006 | Federwisch et al. |
| 7,007,046 | B2 | 2/2006 | Manley et al. |
| 7,010,553 | B2 | 3/2006 | Chen et al. |
| 7,039,663 | B1 | 5/2006 | Federwisch et al. |
| 7,043,485 | B2 | 5/2006 | Manley et al. |
| 7,096,421 | B2* | 8/2006 | Lou ................................ 715/234 |
| 7,225,204 | B2 | 5/2007 | Manley et al. |
| 7,249,150 | B1 | 7/2007 | Watanabe et al. |
| 7,454,445 | B2 | 11/2008 | Lewis et al. |
| 2002/0049720 | A1* | 4/2002 | Schmidt ............................ 707/1 |
| 2002/0078041 | A1 | 6/2002 | Wu |
| 2002/0178146 | A1 | 11/2002 | Akella et al. |
| 2003/0041211 | A1 | 2/2003 | Merkey et al. |
| 2003/0070043 | A1 | 4/2003 | Merkey |
| 2003/0158861 | A1 | 8/2003 | Sawdon et al. |
| 2003/0158863 | A1 | 8/2003 | Haskin et al. |
| 2003/0158873 | A1 | 8/2003 | Sawdon et al. |
| 2003/0159007 | A1 | 8/2003 | Sawdon et al. |
| 2004/0030668 | A1 | 2/2004 | Pawlowski et al. |
| 2004/0078419 | A1 | 4/2004 | Ferrari et al. |
| 2004/0093347 | A1* | 5/2004 | Dada ........................ 707/103 R |
| 2005/0015391 | A1* | 1/2005 | Pohlan ........................... 707/100 |

FOREIGN PATENT DOCUMENTS

| | | |
|---|---|---|
| WO | WO 00/07104 | 2/2000 |
| WO | WO 01/31446 | 5/2001 |

OTHER PUBLICATIONS

"A Technique for Isolating Differences Between Files", by Heckel, Communications of the ACM, Apr. 1978.*

Ting et al. "System and Method for Comparing Data Sets", U.S. Appl. No. 60/531,890, filed Dec. 23, 2003, 32 pages.

Akyurek, Sedat, Placing Replicated Data to Reduce Seek Delays, Department of Computer Science, University of Maryland, UMIACS-TR-91-121, CS-TR-2746, Aug. 1991.

Bitton, Dina, Disk Shadowing, Proceedings of the 14th VLDB Conference, LA, CA (1988).

Chaudhuri, Surajit, et al., Self-Tuning Technology in Microsoft SQL Server, Data Engineering Journal 22, 2 1999 pp. 20-27.

Chutani, Sailesh, et al., The Episode file system, In Proceedings of the USENIX Winter 1992.

Coyne, Robert A., et al., Storage Systems for National Information Assets, Proc. Supercomputing 92, Minneapolis, Nov. 1992, pp. 626-633.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Howard, John H, et al. Scale and Performance in a Distributed File System, Carnegie Mellon University, CMU-ITC-87-068, Aug. 5, 1987.

Howard, John, H. et al., Scale and performance in a distributed file system, ACM Trans. Computer. System., 6(1), Feb. 1988 pp. 51-81.

Howard, John H., An Overview of the Andrew File System, Carnegie Mellon University, CMU-ITC-88-062.

Kazar, Michael Leon, Synchronization and Caching Issues in the Andrew File System, Carnegie Mellon University, CMU-ITC-88-063.

Kazar, Michael L., et al., Decorum File System Architectural Overview, USENIX Summer Conference, Anaheim, California, 1990.

Kemper, Alfons, et al., Performance Tuning for SAP R/3, Data Engineering Journal 22, 2 1999 pp. 33-40.

Kent, Jack et al., Optimizing Shadow Recovery Algorithms, IEEE Transactions on Software Engineering, 14( 2): 155-168, Feb. 1988.

Kistler, et al., Disconnected Operation in the Coda File System, ACM Transactions on Computer Systems, vol. 10, No. 1, Feb. 1992, pp. 3-25.

Lorie, Raymond, A, Physical integrity in a large segmented database, ACM Trans. Database Systems, (2)1: 91-104, Mar. 1977.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987).

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Rosenblum, Mendel, et al., The LFS Storage Manager, Computer Science Division, Electrical Engin. and Computer Sciences, Univ. of CA, presented at Summer '90 USENIX Technical Conference, Anaheim, CA Jun. 1990.

Rosenblum, Mendel, et al, The Design and Implementation of a Log-Structured File System Jul. 24, 1991 pp. 1-15.

Rosenblum, Mendel, The Design and Implementation of a Log-Structured File System, Copyright 1992, pp. 1-93.

Rosenblum, Mendel, et al., The Design and Implementation of a Log-Structured File System, , In Proceedings of ACM Transactions on Computer Systems, (10)1:26-52, Feb. 1992.

Schiefer, Berni, et al., DB2 Universal Database Performance Tuning, Data Engineering Journal 22, 2 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, 2 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, 2 1999 pp. 28-32.

Weikum, Gerhard, et al., Towards Self-Tuning Memory Management for Data Servers, Data Engineering Journal 22, 2 1999 pp. 3-11.

West, Michael, et al. The ITC Distributed File System: Prototype and Experience, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

Hitz et al., "TR3002 File System Design for an NFS File Server Appliance", 1-10, Network Appliance, Inc., Sunnyvale, CA, USA.

"Storage Management Mechanism for Managing Snapshot Pages", IBM Technical Disclosure Bulletin, IBM Corp., New York, US, vol. 35, No. 4B, Sep. 1999, pp. 26-29.

Partial European Search Report, Application No. EP 03251702, Munich, Leuridan, K., Jan. 4, 2005, 4 pages.

Partial European Search Report, Application No. EP 03251703, Munich, Leuridan, K., Jan. 4, 2005, 4 pages.

* cited by examiner

SYSTEM AND METHOD FOR COMPARING DATA SETS

RELATED APPLICATIONS

This application claims the benefit of U.S. Provisional Patent Application Ser. No. 60/531,890 which was filed on Dec. 23, 2003, by Daniel Ting, et al. for a SYSTEM AND METHOD FOR COMPARING DATA SETS, the teachings of which are expressly incorporated by reference.

This application is related to the following United States Patent Applications:

Ser. No. 10/100,950 entitled, SYSTEM AND METHOD FOR ASYNCHRONOUS MIRRORING OF SNAPSHOTS AT A DESTINATION USING A PURGATORY DIRECTORY AND INODE MAPPING, by Stephen L. Manley, et al., now issued as U.S. Pat. No. 7,225,204 on May 29, 2007, the teachings of which are expressly incorporated herein by reference;

Ser. No. 10/100,434, entitled SYSTEM AND METHOD FOR REDIRECTING ACCESS TO A REMOTE MIRRORED SNAPSHOT, by Raymond C. Chen, et al., now issued as U.S. Pat. No. 7,010,553 on Mar. 7, 2006, the teachings of which are expressly incorporated herein by reference;

Ser. No. 10/100,879, entitled FORMAT FOR TRANSMISSION OF FILE SYSTEM INFORMATION BETWEEN A SOURCE AND A DESTINATION, by Stepphen L. Manley, et al., now issued as U.S. Pat. No. 7,007,046 on Feb. 28, 2006, the teachings of which are expressly incorporated herein by reference;

Ser. No. 10/100,967, entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., now issued as U.S. Pat. No. 6,993,539 on Jan. 31, 2006, the teachings of which are expressly incorporated herein by reference; and Ser. No. 10/126,822, entitled SYSTEM AND METHOD FOR CHECKPOINTING AND RESTARTING AN ASYNCHRONOUS TRANSFER OF DATA BETWEEN A SOURCE AND DESTINATION SNAPSHOT, by Michael L. Federwisch, et al., now issued as U.S. Pat. No. 7,039,663 on May 2, 2006, the teachings of which are expressly incorporated herein by reference.

FIELD OF THE INVENTION

This invention relates to comparing two order-independent data sets of unique objects, and more particularly to comparing replicated data sets.

BACKGROUND OF THE INVENTION

A file server is a type of storage server that operates on behalf of one or more clients to store and manage shared files in a set of mass storage devices, such as magnetic or optical storage based disks. As used herein, the term "file" should be interpreted broadly to to include any type of data organization, whether file-based or block-based. Further, as used herein, the term "file system" should be interpreted broadly as a programmatic entity that imposes structure on an address space of one or more physical or virtual disks so that an operating system may conveniently deal with data containers, including files and blocks.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "inplace" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a computer that manages data access and may, in the case of a filer, implement file system semantics, such as the Data ONTAP™ storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or it's infrastructure (e.g. a flood, power outage, act of war, etc.). The minor is updated at regular intervals, typically set by an administrator, in an effort to catch the most recent changes to the file system. One common form of update involves the use of a "snapshot" process in which the active file system at the storage site, consisting of modes and blocks, is captured and the "snapshot" is transmitted as a whole, over a network (such as the well-known Internet) to the remote storage site. Generally, a snapshot is an image (typically read-only) of a file system at a point in time, which is stored on the same primary storage device as is the active file system and is accessible by users of the active file system. By "active file system" it is meant the file system to which current input/output operations are being directed. The primary storage device, e.g., a set of disks, stores the active file system, while a secondary storage, e.g., a tape drive, may be utilized to store backups of the active file system. Once snapshotted, the active file system is reestablished, leaving the snapshotted version in place for possible disaster recovery. Each time a snapshot occurs, the old active file system becomes the new snapshot, and the new active file system carries on, recording any new changes. A set number of snapshots may be retained depending upon various time-based and other criteria. The snapshotting process is described in further detail in U.S. patent application Ser. No. 09/932,578, entitled INSTANT SNAPSHOT by Blake Lewis et al., now issued as U.S. Pat. No. 7,454,445 on Nov. 18, 2008, which is hereby incorporated by reference as though fully set forth herein. In addition, the native Snapshot™ capabilities of the WAFL file system are further described in TR3002 File System Design for an NFS File Server Appliance by David Hitz et al., published by Network Appliance, Inc., and in commonly owned U.S. Pat. No. 5,819, 292 entitled Method for Maintaining Consistent States of A FILE System and for Creating User-Accessible Read-Only Copies of a File System by David Hitz et al., which are hereby incorporated by reference.

The complete recopying of the entire file system to a remote (destination) site over a network may be quite inconvenient where the size of the file system is measured in tens or hundreds of gigabytes (even terabytes). This full-backup approach to remote data replication may severely tax the bandwidth of the network and also the processing capabilities of both the destination and source filer. One solution has been to limit the snapshot to only portions of a file system volume that have experienced changes. Hence, FIG. 1 shows a prior art volume-based mirroring where a source file system 100 is connected to a destination storage site 102 (consisting of a server and attached storage—not shown) via a network link 104. The destination 102 receives periodic snapshot updates at some regular interval set by an administrator. These intervals are chosen based upon a variety of criteria including available bandwidth, importance of the data, frequency of changes and overall volume size.

In brief summary, the source creates a pair of time-separated snapshots of the volume. These can be created as part of the commit process in which data is committed to non-volatile memory in the filer or by another mechanism. The "new" snapshot 110 is a recent snapshot of the volume's active file system. The "old" snapshot 112 is an older snapshot of the volume, which should match the image of the file system replicated on the destination mirror. Note, that the file server is free to continue work on new file service requests once the new snapshot 112 is made. The new snapshot acts as a check point of activity up to that time rather than an absolute representation of the then-current volume state. A differencer 120 scans the blocks 122 in the old and new snapshots. In particular, the differencer works in a block-by-block fashion, examining the list of blocks in each snapshot to compare which blocks have been allocated. In the case of a writeanywhere system, the block is not reused as long as a snapshot references it, thus a change in data is written to a new block. Where a change is identified (denoted by a presence or absence of an 'X' designating data), a decision process 200, shown in FIG. 2, in the differencer 120 decides whether to transmit the data to the destination 102. The process 200 compares the old and new blocks as follows: (a) Where data is in neither an old nor new block (case 202) as in old/new block pair 130, no data is available to transfer (b) Where data is in the old block, but not the new (case 204) as in old/new block pair 132, such data has already been transferred, (and any new destination snapshot pointers will ignore it), so the new block state is not transmitted. (c) Where data is present in the both the old block and the new block (case 206) as in the old/new block pair 134, no change has occurred and the block data has already been transferred in a previous snapshot. (d) Finally, where the data is not in the old block, but is in the new block (case 208) as in old/new block pair 136, then a changed data block is transferred over the network to become part of the changed volume snapshot set 140 at the destination as a changed block 142. In the exemplary write-anywhere arrangement, the changed blocks are written to new, unused locations in the storage array. Once all changed blocks are written, a base file system information block, that is the root pointer of the new snapshot, is then committed to the destination. The transmitted file system information block is committed, and updates the overall destination file system by pointing to the changed block structure in the destination, and replacing the previous file system information block. The changes are at this point committed as the latest incremental update of the destination volume snapshot. This file system accurately represents the "new" snapshot on the source. In time a new "new" snapshot is created from further incremental changes.

Approaches to volume-based remote mirroring of snapshots are described in detail in commonly owned U.S. patent application Ser. No. 09/127,497, entitled FILE SYSTEM IMAGE TRANSFER by Steven Kleiman, et al., now issued as U.S. Pat. No. 6,604,118 on Aug. 5, 2003, and U.S. patent application Ser. No. 09/426,409, entitled FILE SYSTEM IMAGE TRANSFER BETWEEN DISSIMILAR FILE SYS- TEMS by Steven Kleiman, et al., now issued as U.S. Pat. No. 6,574,591 on Jun. 3, 2003, both of which patents are expressly incorporated herein by reference.

Users of replicated storage systems, especially those that perform incremental backups, typically desire to ensure that the stored data is accurate and consistent with that on the primary or source computer. Errors may occur by data loss over a computer network during the remote replication process, replication software errors or the occurrence of other errors on the destination-side.

One known technique for performing a replica consistency check is to compare the entries in each directory or directories on the source and destination file systems. If each entry in the source file system has a corresponding entry in the destination file system, then there is a high probability that the replicated file system on the destination-side is an accurate reflection of the source file system.

Two known methods for comparing the entries of directories are typically used. The first method is a brute force comparison, where each entry on the source-side is individually selected and then a search is made of each of the entries on the destination-side for a match. This comparison technique results in an $O(N^2)$ algorithm as it requires a significant amount of searching through the destination-side directory. An $O(N^2)$ algorithm problem requires an exponential increase in time for each added element. Thus, a problem that has two elements will require four operations, however, if a third element is added, the time number of operations increases to nine. An additional disadvantage is that to be sure that both sides are identical, the procedure would need to be repeated by then selecting each of the entries in the destination-side and searching for a match on the source-side. Otherwise, it would be possible to have an entry on the destination-side that is not present on the source-side, which would remain undetected.

Another technique for identifying and comparing the directories is to select the set of entries from each directory and to alphabetize or otherwise sort them in a specific, well-known order before comparing the sets of sorted directory entries with the sorted to directory entries of the other set. However, the computational requirements to sort a list alphabetically or otherwise is high due to memory and processor constraints. This noted disadvantage is especially acute when, for example, there are tens or hundreds of thousands of entries in a directory.

It is, thus, desirable to have a system and method for comparing two sets of data, for example, two lists of directory entries, without utilizing an $O(N^2)$ or other severely computationally intensive approach.

SUMMARY OF THE INVENTION

The disadvantages of the prior art are overcome by providing a system and method for efficiently comparing two data sets on a computer system. In the illustrative embodiment, the data sets comprise entries of a pair of directories within file systems. First, the system and method generates a hash table, or other suitable data structure, of the directory entries on the source-side. Once the hash table has been created, the system and method then walks through each entry on the destination-side. For each of the entries on the destination-side, the system and method looks it up in the hash table. If the destination-side entry matches one of the entries contained in the hash table entry, an identical directory entry exists on both the source and destination. In such a case, the directory entry is removed from the hash table. If there is no corresponding entry in the hash table for a given destination-side entry, then the system and method may report that the selected entry appears only on the destination. Once all of the entries on the destination-side have been hashed and compared with the entries in the hash table, any entries remaining in the hash table identify entries that appear only in the source directory.

In an alternate embodiment, both sets of entries are walked in concurrent fashion. An element from one directory is selected and the hash table is checked for matches from the other directory. If there is an identical entry, that entry is removed from the hash table. If no identical entry is found, the selected entry is added to the hash table, along with an identifier as to the data set from which the entry originates. Both directories are walked concurrently, ideally at similar rates. However, the algorithm does not require to strict operation ordering. After walking both sets of entries, all remaining entries in the hash table are unique. Thus, the system and method provides an efficient technique for identifying which entries are unique to only one of the sets of data.

The first method provides a computationally efficient approach for identifying commonalities and differences between two data sets. The source directory is traversed once to hash the entries. The destination directory also requires only one traversal. By hashing the directory entries, entry lookups are more efficient and, in fact, as the procedure progresses, hash entries are removed, thereby enabling lookups to occur more and more quickly. By walking each of the directories only once, the impact on the disk subsystem is dramatically reduced. Similarly, faster lookups reduce the impact on the processor subsystem.

The second method provides extra computational and memory efficiency over the first method when the data sets are similar. The first method requires the hashing of all directory entries from one of the directories, thereby fixing memory consumption to that size. The second method, however, removes entries at the same time as they are being added. When the directories are similar, the hash table will remain largely empty, which reduces memory consumption and reduces the computational cost of finding matched/mismatched hash entries. However, the second method is not always superior to the first, especially if the directories are dissimilar. In that case, the method will lead to an even larger hash table, with the concomitant computational and memory-usage penalties.

Both methods optimize the process of comparing two order-independent data sets comprising unique objects. The memory, disk and computational efficiencies dramatically impact the performance of these techniques. Depending on the type of data set, the choice of method can be modified to optimize performance.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network and File Server Environment

Figure 1:
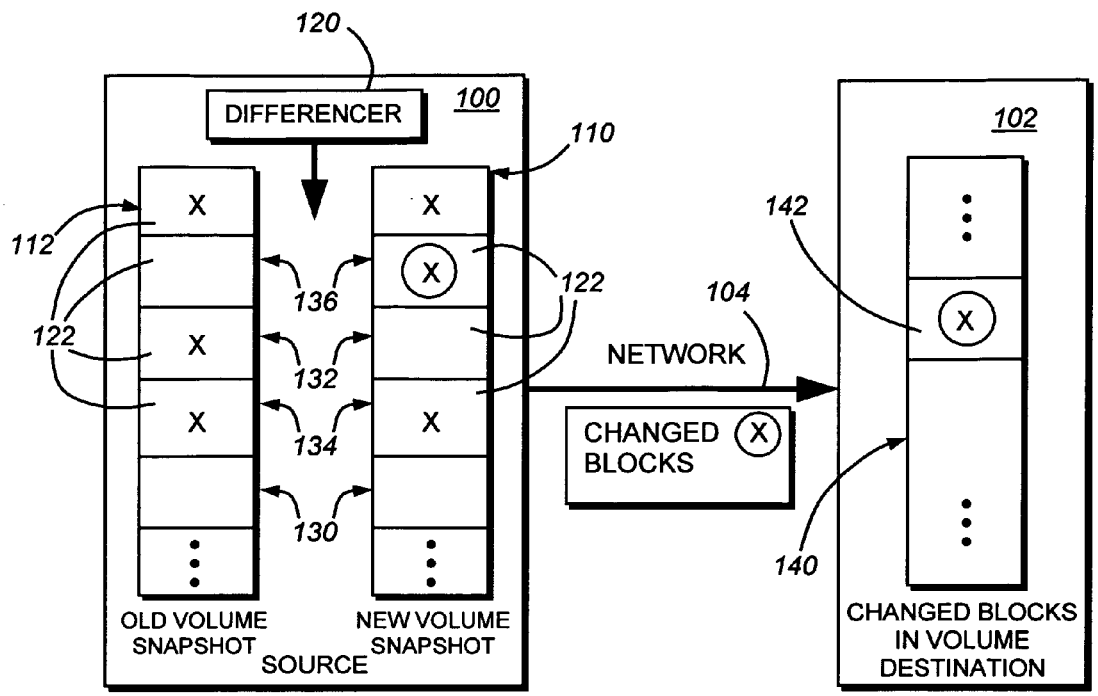
FIG. 1, already described, is a schematic block diagram of an exemplary remote mirroring of a volume snapshot from a source file server to a destination file server over a network according to a prior implementation.
Figure 2:
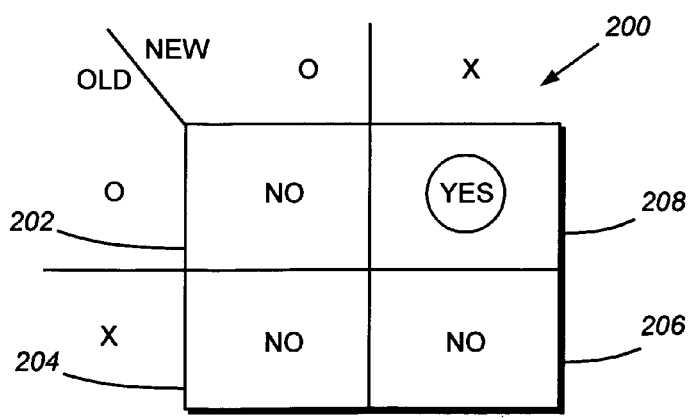
FIG. 2, already described, is a decision table used by a block differencer of FIG. 1 for determining whether a change in a block is to be transmitted from the source file server to the destination file server according to a prior implementation.
Figure 3:
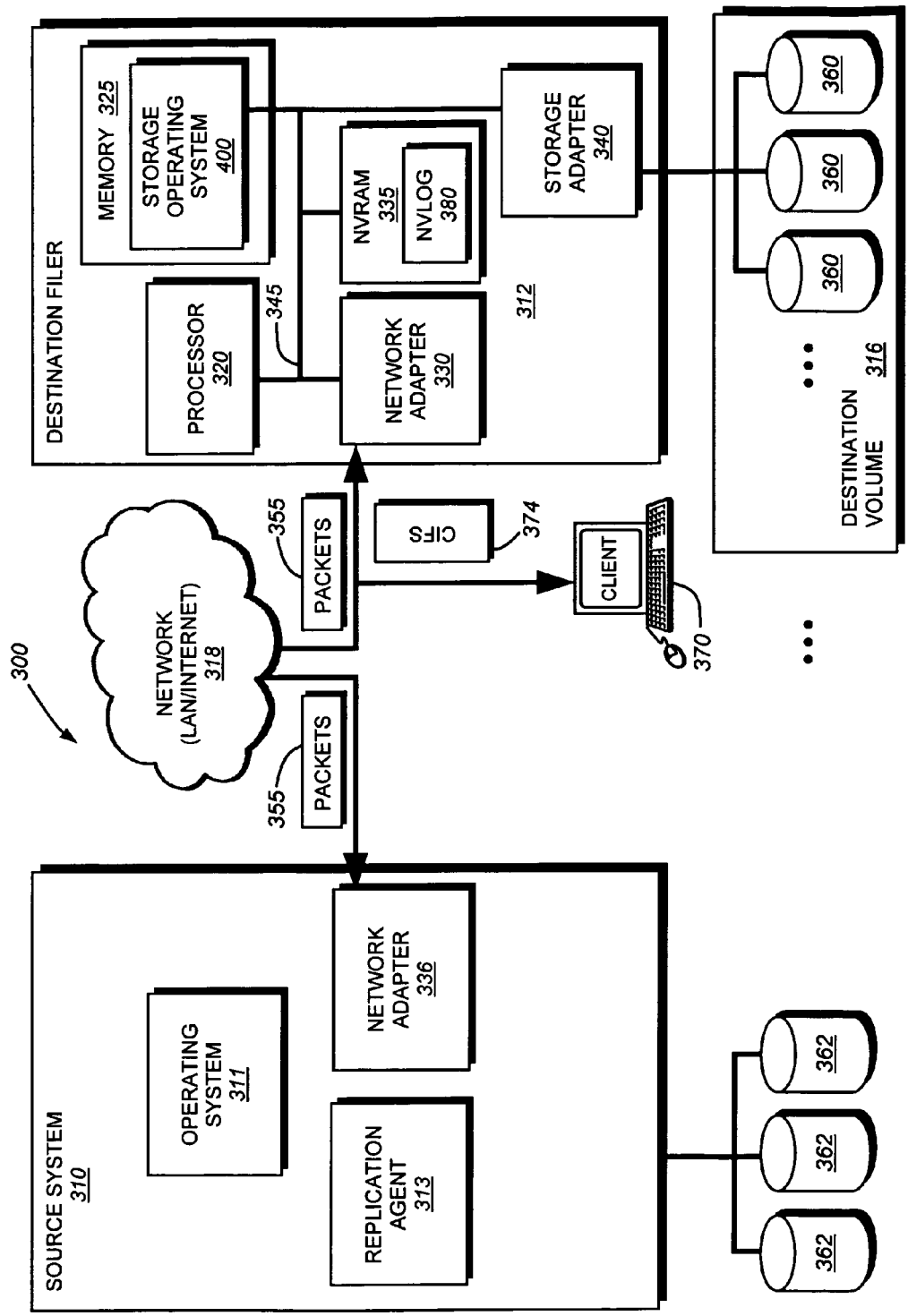
FIG. 3 is a schematic block diagram defining an exemplary network and file server environment including a source file server and a destination file server within which the principles of this invention are implemented.

By way of further background, FIG. 3 is a schematic block diagram of a storage system environment 300 that includes a pair of interconnected computers including a source system 310 and a destination file server 312 that may be advantageously used with the present invention. For the purposes of this description, the source system is a networked computer that manages storage of one or more storage disks 362. The source system 310 executes an operating system 311. The operating system 311 may be, for example, the commercially available Sun Microsystem's Solaris®, Microsoft Windows® 2000, HP/UX or AIX. The operating system 311 implements an OS-specific file system on the disks 362 connected to the source system 310.

The destination filer 312 manages one or more destination volumes 316, comprising arrays of disks 360. The source and destination are linked via a network 318 that can comprise a local or wide area network, such as the well-known Internet. An appropriate network adapter 330 residing the source and destination 310, 312 facilitates communication over the network 318. As used herein, the term "source" can be broadly defined as a location from which the subject data of this invention travels and the term "destination" can be defined as the location to which the data travels. While a source system and a destination filer, connected by a network, is a particular example of a source and destination used herein, a source and destination could be computers/filers linked via a direct link, or via loopback (a "networking" arrangement internal to a single computer for transmitting a data stream between local source and local destination), in which case the source and the destination may comprise the same filer.

The destination filer 312 comprises a processor 320, a memory 325, a network adapter 330 and a storage adapter 340 interconnected by a system bus 345. Filer 312 also includes a storage operating system 400 (FIG. 4) that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, the filer 312 can be broadly, and alternatively, referred to as a storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 325 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system 400, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 330 comprises the mechanical, electrical and signaling circuitry needed to connect the filer 312 to the network 318, which may comprise a point-to-point connection or a shared medium, such as a local area network. Moreover the source 310 may interact with the destination filer 312 in accordance with a client/server model of information delivery. That is, the client may request the services of the filer, and the filer may return the results of the services requested by the client, by exchanging packets 355 encapsulating, e.g., the TCP/IP protocol or another network protocol format over the network 318.

The storage adapter 340 cooperates with the operating system 400 (FIG. 4) executing on the filer to access information requested by the client. The information may be stored on the disks 360 that are attached, via the storage adapter 340 to the filer 312 or other node of a storage system as defined herein. The storage adapter 340 includes input/output (I/O) interface circuitry that couples to the disks over an I/O interconnect arrangement, such as a conventional high-performance, Fibre Channel serial link topology. The information is retrieved by the storage adapter and processed by the processor 320 as part of the snapshot procedure, to be described below, prior to being forwarded over the system bus 345 to the network adapter 330, where the information is formatted into a to packet and transmitted to the destination server as also described in detail below.

The filer may also be interconnected with one or more clients 370 via the network adapter 330. The clients transmit requests for file service to the filer 312 respectively, and receive responses to the requests over a LAN or other network (318). Data is transferred between the client and the filer 312 using data packets 374 defined as an encapsulation of the Common Internet File System (CIFS) protocol or another appropriate protocol, such as NFS.

In one exemplary filer implementation, the filer 312 can include a nonvolatile random access memory (NVRAM) 335 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

In an illustrative embodiment, the disks 360 are arranged into a plurality of volumes (for example, source volumes 314 and destination volumes 316), in which each volume has a file system associated therewith. The volumes each include one or more disks 360. In one embodiment, the physical disks 360 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

To facilitate generalized access to the disks 360, the storage operating system 400 (FIG. 4) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which references to other files and directories are stored. As noted and defined above, in the illustrative embodiment described herein, the storage operating system is the NetApp® Data ONTAP™ operating system available from Network Appliance, Inc., of Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Figure 4:
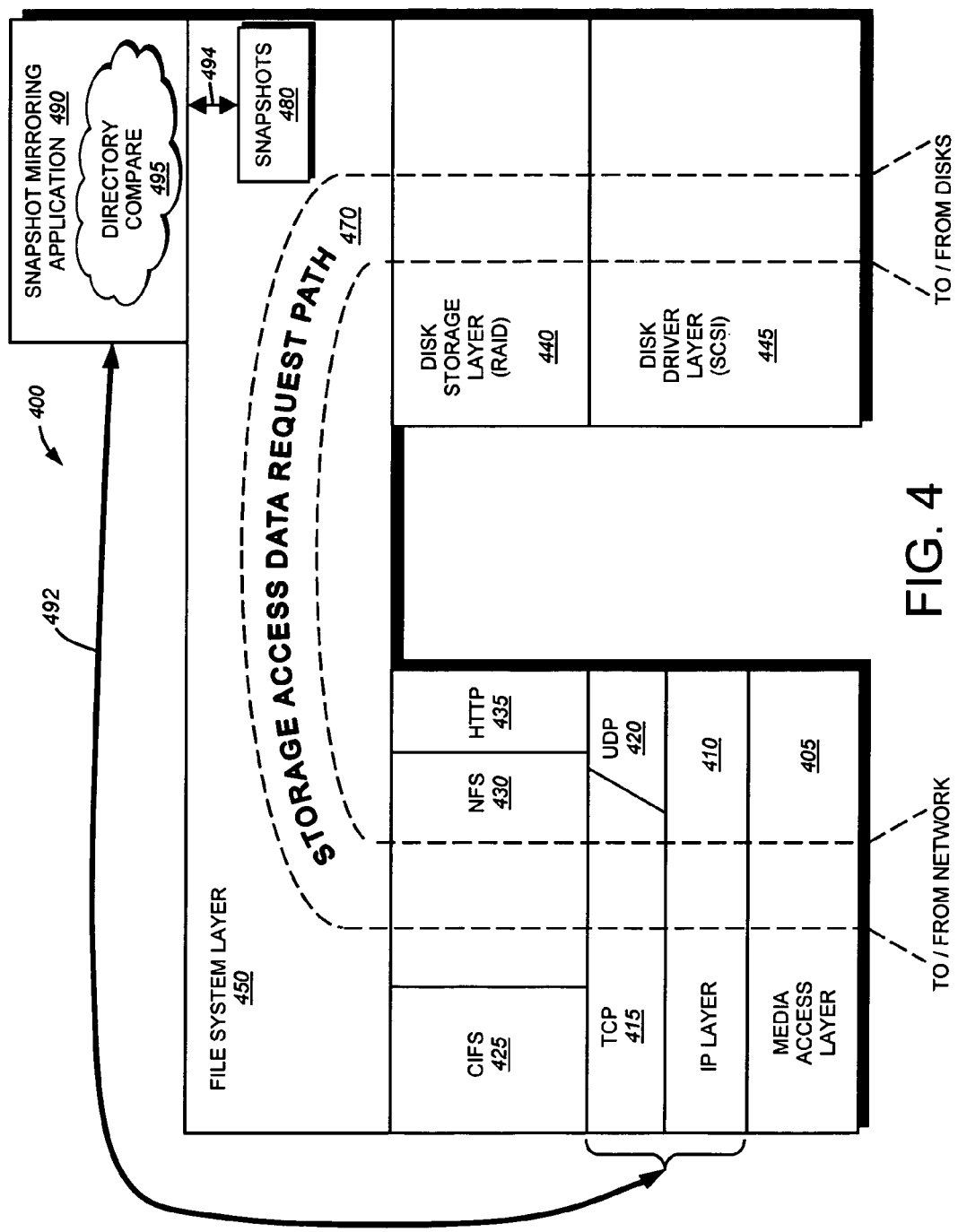
FIG. 4 is a schematic block diagram of an exemplary storage operating system in accordance with an embodiment of the present invention.

The organization of the preferred storage operating system for each of the exemplaty filers is now described briefly. However, it is expressly contemplated that the principles of this invention can be implemented using a variety of alternate storage operating system architectures. As shown in FIG. 4, the exemplary storage operating system 400 comprises a series of software layers, including a media access layer 405 of network drivers (e.g., an Ethernet driver). The operating system further includes network protocol layers, such as the Internet Protocol (IP) layer 410 and its supporting transport mechanisms, the Transport Control Protocol (TCP) layer 415 and the User Datagram Protocol (UDP) layer 420. A file system protocol layer provides multi-protocol data access and, to that end, includes support for the CIFS protocol 425, the NFS protocol 430 and the Hypertext Transfer Protocol (HTTP) protocol 435. In addition, the storage operating system 400 includes a disk storage layer 440 that implements a disk storage protocol, such as a RAID protocol, and a disk driver layer 445, that implements a disk control protocol such as the small computer system interface (SCSI).

Bridging the disk software layers with the network and file system protocol layers is a file system layer 450 of the storage operating system 400. Generally, the layer 450 implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer's memory 325. If the information is not in memory, the file system layer 450 indexes into the inode file using the inode number to access an appropriate entry and retrieve a volume block number. The file system layer 450 then passes the volume block number to the disk storage (RAID) layer 440, which maps that volume block number to a disk block number and sends the latter to an appropriate driver (for example, an encapsulation of SCSI implemented on a fibre channel disk interconnection) of the disk driver layer 445. The disk driver accesses the disk block number from volumes and loads the requested data in memory 325 for processing by the filer 312. Upon completion of the request, the filer (and storage operating system) returns a reply, e.g., a conventional acknowledgement packet 374 defined by the CIFS specification, to the client 370 over the respective network connection 318.

It should be noted that the software "path" 470 through the storage operating system layers described above needed to perform data storage access for the client request received at the filer may alternatively be implemented in hardware or a combination of hardware and software. That is, in an alternate embodiment of the invention, the storage access request data path 470 may be implemented as logic circuitry embodied within a field programmable gate array (FPGA) or an application specific integrated circuit (ASIC). This type of hardware implementation increases the performance of the file service provided by the filer 312 in response to a file system request packet 374 issued by the client 370.

Overlying the file system layer 450 is the snapshot mirroring (or replication) application 490. This application is responsible for the generation of the updated mirror snapshot from received information from the source. The snapshot mirroring application 490 operates outside of the storage access request path 470, as shown by the direct links 492 and 494 to the TCP/IP layers 415, 410 and the file system snapshot mechanism (480).

In accordance with an embodiment of the present invention, within the snapshot mirroring application 490 is a directory comparison process 495 that implements the novel data comparison function, described further below.

C. Directory Comparison

In accordance with the illustrative embodiment of the present invention, a user-executable command is provided by the storage operating system of the destination storage system to enable the comparison of directories and associated contents between the source and destination systems. It should be noted that the teachings of the present invention may be utilized to compare any two data sets wherein each of the entries is unique and the order of the objects is not relevant to the comparison. Thus, the description concerning comparison of directory entries of two data sets as described herein should be taken as illustrative and exemplary only.

Figure 5:
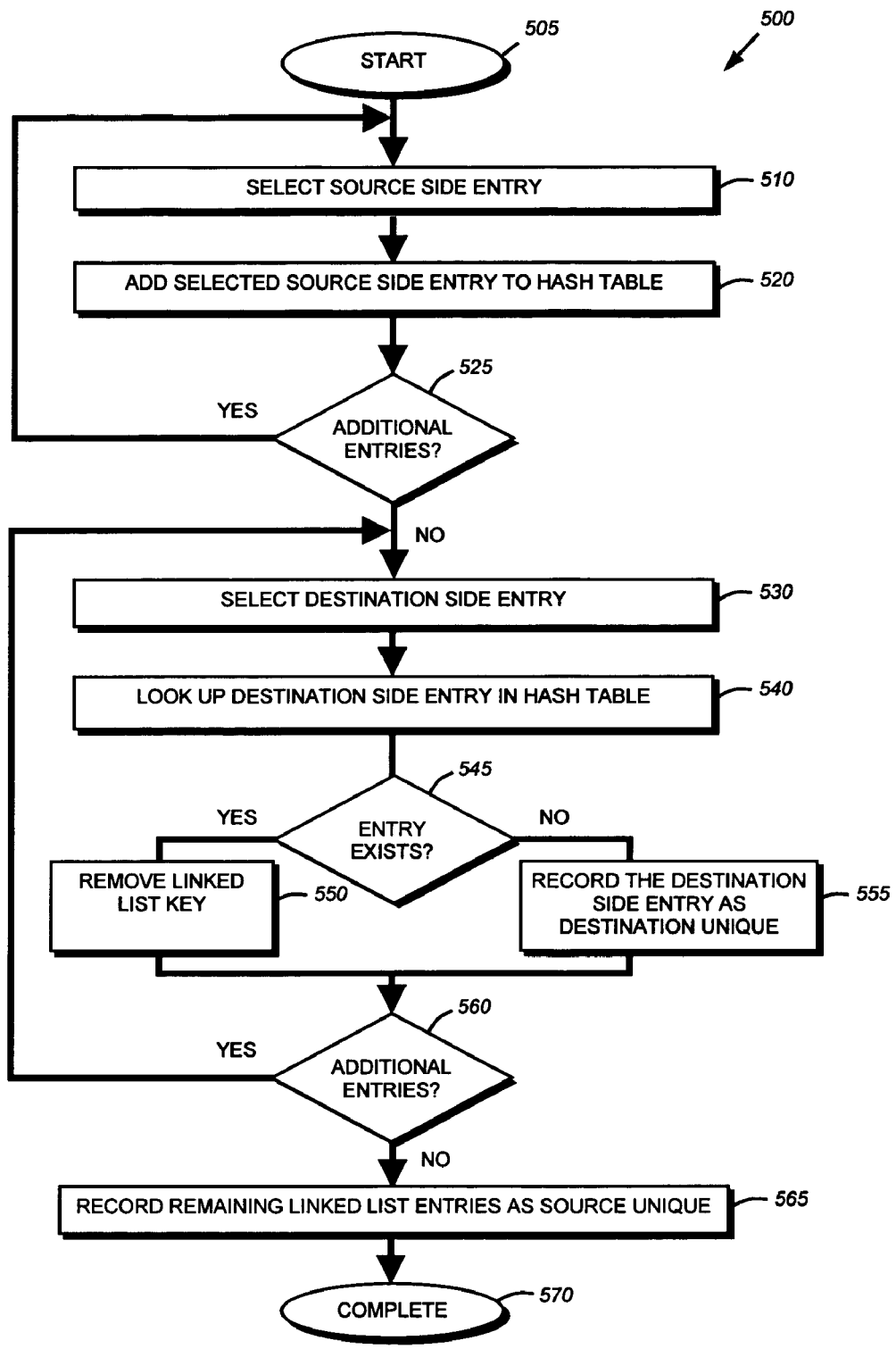
FIG. 5 is a flowchart detailing the steps of a procedure for comparing two data sets in accordance with an embodiment of the present invention.

FIG. 5 is a flowchart detailing the steps of a procedure 500 that implements the novel data comparison routine in accordance with an illustrative embodiment of the present invention. The procedure begins in step 505 and proceeds to step 510 where the source-side directory entry is selected for comparison. It should be noted that in the illustrative embodiment, the procedure will begin upon the execution of a user command; however, in alternate embodiments the storage operating system may automatically execute the procedure 500, either at various time intervals or in response to receiving updated data from a source. Then, in step 520, the procedure adds the selected entry to the hash table, described further below. In accordance with the illustrative embodiment, the procedure generates a hash table. It should be noted that the use of a hash table is exemplary only. Any suitable data structure that provides for fast lookup of data may be utilized, including, for example, a B-tree. As such, the term "hash table" should be taken to mean any acceptable data structure.

Once the entry has been added to the hash table, the procedure then determines whether there are additional source-side entries in step 525. If additional entries exist, the procedure loops back to step 510 and selects an additional source-side entry to be added to the hash table.

If no additional source-side entries exist, the procedure continues to step 530 where it selects a destination-side entry and then, in step 540, looks up the selected destination-side entry in the hash table. In step 545, a determination is made if an entry exists in the hash table that is identical to the selected destination-side entry. If an entry exists, the procedure branches to step 550 where the entry is removed from the hash table. Thus, if a destination-side entry matches a source-side entry, the source-side entry is removed from the hash table. As the procedure continues, the number of entries in the hash table decreases. A noted benefit of this behavior is that memory consumption decreases as well as computation time for entry lookup. Otherwise, if no entry exists, the procedure branches to step 555, where it records that the destination-side entry is destination unique, i.e., the destination-side entry only appears on the destination and not on the source. After either step 550 or step 555, the procedure then determines whether there are additional destination-side entries to check in step 560. If there are additional destination-side entries, the procedure loops back to step 530 and selects another destination-side entry. Otherwise, the procedure continues on to step 565. In step 565, the procedure records any records remaining in the hash table as being source unique. The procedure is then complete in step 570.

Thus, during the operation of the procedure 500, any entries that are destination unique (e.g., only occur on the destination) are identified when no corresponding source-side entry is found in the hash table. Similarly, at the completion of the procedure, those entries that remain in the hash table are source-side unique. In the exemplary embodiment described above, a record is made in steps 555 and 565 of destination or source-side unique entries.

Figure 6:
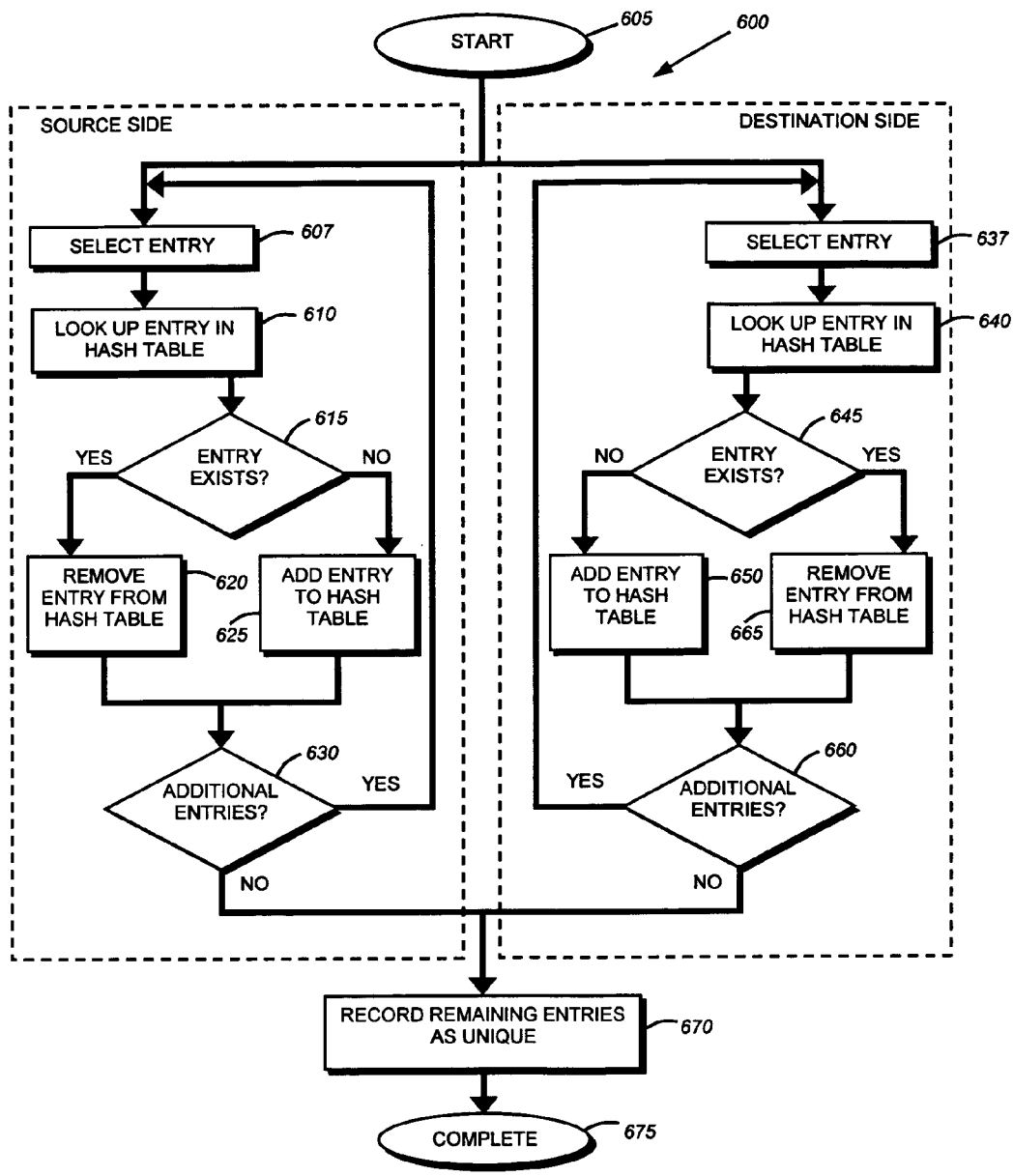
FIG. 6 is a flowchart detailing the steps of a procedure for comparing two data sets in accordance with an alternate embodiment of the present invention.

FIG. 6 is a flow chart detailing the steps of a procedure 600 that implements a novel data comparison routine in accordance with an alternate embodiment of the present invention. In this alternate embodiment both sets of entries are walked in concurrent fashion. The procedure 600 begins in step 605 and then proceeds to concurrently run on both the source side and destination side. The procedure selects an entry from the source data set in step 607. Then, in step 610, the procedure looks up the selected entry in the hash table and, in step 615, determines if the entry exists in the hash table. If the entry does exist in the hash table, then the procedure removes the entry from the hash table in step 620. Otherwise, if the entry does not exist in the hash table, the procedure adds the entry to the hash table with an identifier that the entry comes from the source (step 625). The procedure then, in step 630, determines if there are additional entries on the source side. If there are additional entries in the source data set the procedure then branches back to step 607 to select another entry. If there are no additional entries, the procedure continues on to step 670.

Similarly, the procedure selects an entry from the destination side data set in step 637. The procedure then looks up the entry in the hash table in step 640. A determination is made if the entry exists in the hash table in step 645. If the entry does not exist, the procedure branches to step 650 and adds an entry to the hash table with an identifier that the entry comes from the destination. Otherwise, if the entry does exist, the procedure removes the entry from the hash table in step 665. The procedure then determines if there are additional entries in step 660. If there are additional entries to be processed, the procedure branches back to step 637 to select an additional entry. Otherwise the procedure continues to step 670. In step 670, the procedure waits until no additional entries remain on either side to process. The procedure then records the remaining entries in the hash table as unique to the side indicated by their identifiers. The procedure then completes in step 675.

This alternate embodiment is an optimization of the general inventive technique. When the directories are similar, an entry is added to the hash table by one of the processes and then removed in short order by the other process. Thus, the size of the hash table never grows significantly beyond the few different entries between the directories, whereas the first algorithm always grows the hash table to the size of the source directory.

In alternate embodiments for both algorithms, the procedure may execute a remediation procedure, for example, to invoke a process to correct the discrepancy, delete the unique files, or perform another function. The recording of unique entries should therefore be taken as exemplary only.

Having described on illustrative embodiment of the invention, it should be clear that the above-described approaches advantageously decrease the time and resources required to perform the noted comparison. The system and method may experience improved performance during the course of operation due to the reduced search space required in identifying elements and memory consumption for storing them. Another noted advantage of the present invention, is that the procedure requires only one pass to identify both the source and destination-side unique entries, unlike the prior art which typically required two or more passes through the data. This generates noted improvements in disk, processor, and memory utilization.

The foregoing has been a detailed description of illustrative embodiments of the invention. Various modifications and additions can be made without departing from the spirit and scope of the invention. The novel system and method of the present invention may be directed to comparing any two data sets of order-independent unique entries. The illustrative embodiment is directed towards comparing directory entries on a source and destination system. However, it should be noted that the present invention has application to a broader set of data comparisons.

Likewise, the internal architecture of the servers or their respective storage arrays, as well as their network connectivity and protocols, are all highly variable. The operating systems used on various source and destination servers can differ. In addition, it is expressly contemplated that any of the operations and procedures described herein can be implemented using hardware, software comprising a computer-readable medium having program instructions executing on a computer, or a combination of hardware and software.

What is claimed is:

1. A computer method for comparing a data set of a source storage system replicated on a destination storage system, comprising:
   (a) hashing entries in a first directory and placing hash values for the entries in a hash table, the first directory stored on the source storage system;
   (b) selecting an entry in a second directory and hashing the selected entry to provide a selected hash value, the second directory stored on the destination storage system, wherein the source storage system and the destination storage system are operatively connected via a network;
   (c) looking up a match between the selected hash value of the selected entry and a first hash value in the hash table;
   (d) removing the first hash value from the hash table in response to the match between the selected hash value of the selected entry and the first hash value in the hash table;
   (e) determining if an additional entry in the second directory exists;
   (f) looping to step (b) in response to identifying the additional entry in the second directory; and (g) reporting a difference between the first directory and the second directory in response to at least one hash value entry remaining in the hash table.

2. The method of claim 1 further comprising identifying that the selected entry is second directory unique in response to no match between the selected hash value of the selected entry and the first hash value in the hash table.

3. The method of claim 1 further comprising performing a remedial function in response to no match between the selected hash value of the selected entry and the first hash value in the hash table.

4. The method of claim 3 wherein the remedial function comprises deleting the selected entry in the second directory.

5. The method of claim 1 further comprising identifying any remaining hash value entry in the hash table as being first directory unique in response to determining that no additional entry in the second directory exists.

6. The method of claim 1 further comprising performing a remedial function in response to determining that no additional entry in the second directory exists.

7. The method of claim 6 wherein the remedial function comprises deleting the selected entry in the first directory.

8. The method of claim 6 wherein the remedial function comprises transferring the selected entry from the first directory to the second directory.

9. The method of claim 1 wherein the data are organized by a RAID system.

10. The method of claim 1 wherein the hash table comprises a B-tree.

11. The method of claim 1 wherein the hash table comprises a fast lookup data structure.

12. A computer system for comparing a first data set with a second data set, comprising:
   (a) means for hashing entries in the first data set and means for placing hash values for the entries in a hash table, the first data set stored on a source storage system;
   (b) means for selecting an entry in the second data set and hashing the selected entry to provide a selected hash value, the second data set stored on a destination storage system, wherein the source storage system and the destination storage system are operatively connected via a network;
   (c) means for looking up a match between the selected hash value of the selected entry and a first hash value in the hash table;
   (d) means for removing the first hash value from the hash table in response to the match between the selected hash value of the selected entry and the first hash value in the hash table;
   (e) means for determining if an additional entry in the second data set exists;
   (f) means for looping to step (b) in response to identifying the additional entry in the second data set; and
   (g) means for reporting a difference between the first data set and the second data set in response to at least one hash value entry remaining in the hash table.

13. The system of claim 12 wherein the hash table comprises a B-tree.

14. A computer readable storage medium containing executable program instructions executed by a processor, comprising:
   (a) program instructions that hash entries in a first data set and program instructions that place hash values for the entries in a hash table, the first data set stored on a source storage system;
   (b) program instructions that select an entry in a second data set and program instructions that hash the selected entry to provide a selected hash value, the second data set stored on a destination storage system, wherein the source storage system and the destination storage system are operatively connected via a network;
   (c) program instructions that look up a match between the selected hash value of the selected entry and a first hash value in the hash table;
   (d) program instructions that remove the first hash value from the hash table in response to the match between the selected hash value of the selected entry and the first hash value in the hash table;
   (e) program instructions that determine if an additional entry in the second data set exists;
   (f) program instructions that loop to step (b) in response to identifying the additional second data set entry; and
   (g) program instructions that report a difference between the first data set and the second data set in response to at least one hash value entry remaining in the hash table.

15. A computer method for comparing a first data set with a second data set, comprising:
   creating a hash table of hashed value entries from entries of the first data set, the first data set stored on a source storage system;
   locating an entry from the second data set and creating a hash value entry in the hash table, the second data set stored on a destination storage system, wherein the source storage system and the destination storage system are operatively connected via a network;
   removing, in response to locating the hash value entry from the second data set in the hash table, the hash value entry from the hash table; and
   recording, in response to at least one hash value entry remaining in the hash table, a difference between the first data set and the second data set.

16. A computer method for comparing a first data set with a second data set, comprising:
   creating a hash table of hash value entries of the first data set, the first data set stored on a source storage system, the hash table comprising one or more hashed values of the first data set;
   determining whether a hashed value of an entry of the second data set is identical to a first hashed value entry in the hash table, the second data set stored on a destination storage system, wherein the source storage system and the destination storage system are operatively connected via a network;
   removing, in response to determining that the hashed value of the second data set is identical to the first hashed value entry in the hash table, the first hashed value entry from the hash table;
   recording, in response to determining that the hashed value of the second data set is not identical to the first hashed value entry in the hash table, the hashed value of the second data set as unique; and
   reporting a difference between the first data set and the second data set in response to at least one hashed value entry remaining in the hash table.

17. A computer method for comparing a first data set with a second data set, comprising:

(a) selecting an entry of the first data set;

(b) determining if a hashed value of the selected entry of the first data set is in a hash table, the hash table comprising one or more hashed values of the first data set;

(c) adding the hashed value of the selected entry of the first data set to the hash table in response to determining that the hashed value of the selected entry of first data set is not in the hash table;

(d) removing from the hash table the hashed value of the selected entry of the first data set in response to determining that the hashed value of the selected entry of the first data set is in the hash table;

(e) selecting an entry of the second data set;

(f) determining if a hashed value of the selected entry of the second data set is in the hash table, the hash table further comprising one or more hashed entries of the second data set;

(g) adding the hashed value of the selected entry of the second data set to the hash table in response to determining that the hashed value of the selected entry of the second data set is not in the hash table, the hashed value of the selected entry of the second data set to the hash table;

(h) removing from the hash table the hashed value of the selected entry of the second data set in response to determining that the hashed value of the selected entry of the second data set is in the hash table;

(i) continuing (a) through (d) and (e) through (h) respectively for all entries in the first and the second data sets until both the first and the second data sets have been completely processed; and (j) reporting a difference between the first data set and the second data set in response to at least one hashed value remaining in the hash table.

18. The method of claim 17 wherein adding the hashed value of the selected entry of the first data set to the hash table further comprises adding information identifying the hashed value of the selected entry of the first data set as originating from the first data set.

19. The method of claim 17 wherein adding the hashed value of the selected entry of the second data set to the hash table further comprises adding information identifying the hashed value of the selected entry of the second data set as originating from the second data set.

20. The method of claim 17 wherein the data are organized by a RAID system.

21. The method of claim 17 further comprising:

(k) recording all hashed value entries remaining in the hash table as being unique to either the first data set or the second data set.

22. The method of claim 17 wherein the hash table comprises a B-tree.

23. The method of claim 17 wherein the hash table comprises a fast lookup data structure.

24. The method of claim 17 wherein the first data set comprises a set of directory entries on a source system.

25. The method of claim 17 wherein the second data set comprises a set of directory entries on a destination system.

26. The method of claim 17 wherein the first data set and second data set are on different storage devices.

27. A system for performing a consistency check of a source directory replicated to a destination directory by comparing entries in the source and destination directories, comprising:

one or more storage devices operatively connected to a computer configured to store one or more entries of a group consisting of the source directory and the destination directory; and a processor of the computer configured to execute a process, the process configured to compare entries of the source directory with entries of the destination directory by storing a hash value of each entry of the source directory and the destination directory in a hash table, the process further configured to remove from the hash table any hash value of the destination directory which matches any hash value of the source directory.

28. The system of claim 27 wherein the process executes on a computer associated with the source directory.

29. The system of claim 27 wherein the process executes on a computer associated with the destination directory.

30. A system for performing a consistency check of a source directory and a destination directory, comprising:

one or more storage devices operatively connected to a computer configured to store one or more entries of a group comprising the source directory and the destination directory; and a processor of the computer configured to execute a process, the process configured to compare entries of the source directory with entries of the destination directory by storing a hash value of each entry of the source directory in a hash table, the process further configured to remove any entry from the hash table which matches any hash value of the destination directory.

31. A computer readable storage medium containing executable program instructions executed by a processor, comprising:

(a) program instructions that select an entry of a first data set, the first data set stored on a source storage system;

(b) program instructions that determine if a hashed value of the selected entry of the first data set is in a hash table, the hash table comprising one or more hashed values of the first data set;

(c) program instructions that add the hashed value of the selected entry of the first data set to the hash table in response to determining that the hashed value of the selected entry of first data set is not in the hash table;

(d) program instructions that remove from the hash table the hashed value of the selected entry of the first data set in response to determining that the hashed value of the selected entry of the first data set is in the hash table;

(e) program instructions that select an entry of a second data set, the second data set stored on a destination storage system;

(f) program instructions that determine if a hashed value of the selected entry of the second data set is in the hash table, the hash table further comprising one or more hashed entries of the second data set;

(g) program instructions that add the hashed value of the selected entry of the second data set to the hash table in response to determining that the hashed value of the selected entry of the second data set is not in the hash table;

(h) program instructions that remove from the hash table the hashed value of the selected entry of the second data set in response to determining that the hashed value of the selected entry of the second data set is in the hash table;

(i) program instructions that continue (a) through (d) and (e) through (h) respectively for all entries in the first and the second data sets until both the first and the second data sets have been completely processed; and (j) program instructions that report a difference between the first data set and the second data set in response to at least one hashed value remaining in the hash table.

32. The computer readable medium of claim 31 further comprising program instructions that alternate in selecting entries from the source and destination directories.

33. The method of claim 1 wherein reporting comprises recording the difference on a storage device operatively connected to the source storage system.

34. The method of claim 17 wherein reporting comprises recording the difference on a storage device operatively connected to a computer.

35. The system of claim 27 wherein the process is further configured to add to the hash table any hash value which does not match any hash value of the source directory and the destination directory.

* * * * *

UNITED STATES PATENT AND TRADEMARK OFFICE
CERTIFICATE OF CORRECTION

| | | |
|---|---|---|
| PATENT NO. | : 7,921,110 B1 | Page 1 of 1 |
| APPLICATION NO. | : 10/776057 | |
| DATED | : April 5, 2011 | |
| INVENTOR(S) | : Daniel Ting | |

It is certified that error appears in the above-identified patent and that said Letters Patent is hereby corrected as shown below:

In Col. 1, line 27 should read:
    A SOURCE AND A DESTINATION, by ~~Stepphen~~ Stephen L. Man- In Col. 1, line 58 should read:
    interpreted broadly ~~to~~ to include any type of data organiza- In Col. 3, line 26 should read:
    war, etc.). The ~~minor~~ mirror is updated at regular intervals, typically In Col. 3, line 30 should read:
    file system at the storage site, consisting of ~~modes~~ inodes and blocks, In Col. 5, line 40 should read:
    entries with the sorted ~~to~~ directory entries of the other set.

In Col. 6, line 14 should read:
    However, the algorithm does not require ~~to~~ strict operation In Col. 8, line 40 should read:
    a ~~to~~ packet and transmitted to the destination server as also In Col. 9, line 30 should read:
    for each of the ~~exemplaty~~ exemplary filers is now described briefly Signed and Sealed this
Fifteenth Day of May, 2012

David J. Kappos
*Director of the United States Patent and Trademark Office*